Feb. 12, 1946.    L. D. MARTIN    2,394,623
SPUR GEAR TESTING MACHINE
Filed July 13, 1944    2 Sheets-Sheet 1

LOUIS D. MARTIN
INVENTOR

BY
ATTORNEYS

Feb. 12, 1946.    L. D. MARTIN    2,394,623
SPUR GEAR TESTING MACHINE
Filed July 13, 1944    2 Sheets-Sheet 2

LOUIS D. MARTIN
INVENTOR
BY
ATTORNEYS

Patented Feb. 12, 1946

2,394,623

UNITED STATES PATENT OFFICE 2,394,623

SPUR GEAR TESTING MACHINE

Louis D. Martin, Rochester, N. Y., assignor to Eastman Kodak Company, Rochester, N. Y., a corporation of New Jersey Application July 13, 1944, Serial No. 544,746

10 Claims. (Cl. 33—179.5)

This invention relates to machines for testing spur gears. One object of my invention is to provide a machine which can be used to determine whether the pitch diameter of spur gears is accurate and to determine tooth to tooth variations in the shape of teeth of the gear, the machine being so arranged that the degree of inaccuracy may be read from a dial. Another object of my invention is to provide a spur gear testing machine with a means for rapidly and accurately positioning gears into the machine so that they may be tested. Another object of my invention is to provide a machine with which the accuracy of any individual tooth or all of the teeth of gears may be measured. A still further object of my invention is to provide a machine which may be easily and rapidly set up for testing different types of gears. Other objects will appear from the following specification, the novel features being particularly pointed out in the claims at the end thereof.

For many purposes it is necessary to have gears, the teeth of which meet certain requirements of accuracy, and it is, therefore, desirable to have a machine into which gears may be placed to determine the degree of accuracy of the gears both as to pitch diameter and as to accumulated tooth error. So far as I am aware most gear testing machines employ master gears which are made as accurately as possible and by measuring deviations in centers on which a master gear and a gear to be tested are mounted, inaccuracies in the gear to be tested can be told within certain limits. However, it is impossible to make master gears with an extremely high degree of accuracy, as for instance within one or two ten thousandths of an inch to a theoretical size. Consequently, with most of the known types of gear testing machines the accuracy of the measurement is determined by the accuracy with which the master gear can be produced.

In my copending application for Method and apparatus for gear checking, Serial No. 478,044, filed March 4, 1943, I have shown a gear testing machine which employs what I call a master worm section in the general form of a rack which can be run or moved across a suitably mounted gear to measure inaccuracies in the pitch diameter in gear teeth. Since such a worm section can be made far more accurately than a master gear, much more accurate results can be obtained and, with care in the manufacture of the worm section, a tooth profile accuracy within .00005" to .00015" may be obtained.

It is well known that screw or worm threads are difficult to produce without varying degrees of aperiodic errors along their thread helices. The elimination and control of this irregularity of lead is a difficult thing to do and many suggestions have been made for reducing the aperiodic error. The effect of such an error causes an uneven movement of the mating member. Thus, a worm which has a known variation in its lead is engaged with a worm wheel, and the worm is revolved through a given arc, the wheel will advance at a different rate than for the same angular movement of the worm through another similar arc.

Now because I use a master worm section as a measuring tool, but do not rotate it about its axis, it effects only line contact with the gear being tested. It is advaned along a fixed path in mesh with the gear being tested. Therefore, any aperiodic error which existed in the worm of which the master worm section is a small segment, no matter of what magnitude, is not transmitted to the mating member as such. The action of the worm section with its mating gear becomes analogous to the action of a gear engaging a conjugate rack which has limited thickness. Thus, my gear testing unit is approximately ten times as accurate as a machine using a master gear for testing because of the increased accuracy of the testing tool itself.

My present gear testing machine is for a special and simplified form of the gear testing machine shown in my copending application above mentioned. It is particularly designed for measuring spur gears accurately and rapidly.

Coming now to the drawings wherein like reference characters denote like parts throughout:

My machine consists broadly in a base which carries a master worm section so that this testing tool may be slid beneath a gear so as to rotate the gear one revolution. The gear to be tested is mounted upon a hinged arm while the hinged arm is in an inoperative or rest position and, after mounting, the latch may be released and the gear may be brought down into contact with the teeth of the master worm section for testing or the gear may be brought down so that an accurately formed pad carried by the gear holder and having a predetermined relationship to the desired pitch diameter can be brought down upon a similar pad carried by the master worm section for initially determining the position of the arm. The movement of the hinged arm and the position thereof can be read from a suitable dial which in this case is graduated into units of one ten thousandth of an inch. Thus, variations from the pitch diameter or variations in the teeth from the theoretical shape can be determined by watching the dial.

Figure 3:
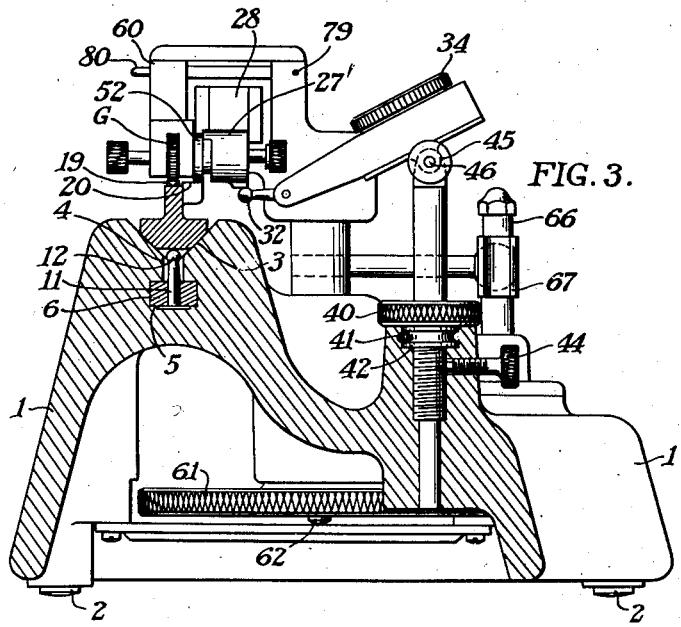
Fig. 3 is a transverse section taken on line 3—3 of Fig. 1.

More specifically, my invention includes a base member 1 which may be mounted upon three feet 2, the base including a pair of rails 3. These rails, as shown in Fig. 3, may be substantially V-shaped in cross section and between the closest portions of the rails there is a slot 4 terminating in an undercut slideway 5.

Figure 4:
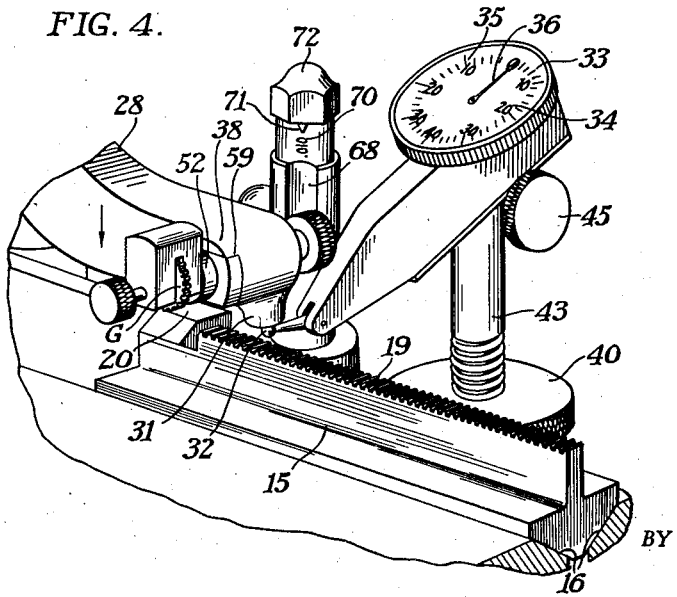
Fig. 4 is a fragmentary perspective view of a portion of the gear testing machine.

A slide member 6 is mounted to move in this slideway, the extent of movement being limited by a stop 7 at one end which may be fastened in place by a setscrew 8 and a stop 9 at the other end which may be fastened in place by a handle 10 operating a setscrew similar to the setscrew 8. The slide member 6 carries an upstanding pin 11 having a rounded split end 12. This end forms a spring latch which may be engaged in a notch 13 cut in the bottom 14 of the gear testing tool designated broadly as 15. This tool, as shown in Fig. 4, may include a pair of rails 16 which are complemental in shape to the rails 3 so that the tool may slide in the slideway. A handle 17 may be attached to the slide 6 as by screws 18 so that when the slide 6 is moved back and forth the gear testing tool 15 may move with it.

The gear testing tool 15 is preferably in the form of a master worm section, the teeth of which 19 have the general appearance of a rack. The teeth have, however, a lead angle since they are teeth of a worm section and, consequently, in order for a spur gear to mesh properly with these teeth, the angle of the spur gear must be carefully adjusted to the proper angle.

At the end of the toothed section 19 of the tool 15, I provide an accurately formed pad 20 which may be either arranged to give the elevation of the pitch diameter of the teeth or which may be located in some predetermined relationship therewith. I prefer to provide the pad 20 at the proper elevation with respect to the teeth 19 to give accurately the pitch diameter of the teeth because, by so doing, I can also provide a pad on the gear holder representing the pitch diameter of the gear to be tested so that by contacting these two pads an initial setup can be made as will be hereinafter more fully described.

Figure 5:
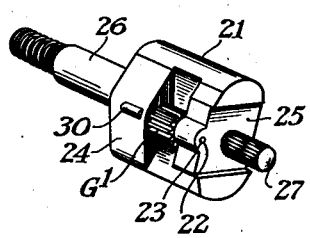
Fig. 5 is a perspective view of a typical gear holder which may be used to support a gear in proper position relative to the master worm section testing tool.

The gear to be tested, G, must be held in the proper relationship to the teeth 19 of the testing tool. This is done in the following manner: Referring to Fig. 5, the test gear $G^1$ may be mounted in a holder designated broadly as 21 by inserting the shafts 22 of the gear in bearings 23 in the fixed block 24 and in the movable block 25. The movable block may be moved axially of the shaft 26 by means of the knurled pin 27. The shaft 26 may pass through a suitable bearing 27' in a hinged arm 28 supported by a post 29 as indicated in Fig. 3.

The pinion holder Fig. 5 is shown as being provided with an accurately formed surface 30, the elevation of this surface from the axis of shaft 22 being the same as the theoretical pitch diameter of the pinion $G^1$. Consequently, when a gear held by the holder 47 is carried by the hinged arm 28 and the arm is lowered into the position shown in Fig. 4 in which the pads 52 and 20 rest on each other, the gear is in a position to be tested. In this position an accurately formed pad 31 carried by the arm 28 lies in a position in which it may contact with a feeler arm 32 operating a dial micrometer 33. In the present instance I have utilized a "Testmaster" micrometer made by the Federal Products Corporation of Providence, R. I. These micrometers are graduated into .0001" and are provided with an adjustable rim 34 which can adjust graduations 35 relative to a pointer 36. Thus, when the parts are in the position of Fig. 4, the rim 34 may be turned until the zero graduation is brought opposite to the pointer 36. Now, if the testing tool is moved, the teeth of the gear G may be meshed with the teeth 19 of the master worm section. There should be no change between the pointer and the dial graduations when this movement is accomplished unless the gear teeth are inaccurate. By slowly moving the handle 17, the gear G may be rotated and, by noting the deviations of the pointer 36 from the zero position, the deviations in ten thousandths of an inch of the gear teeth G from the gear teeth 19 of the master worm section can be determined. Thus, if the standard deviation may be .0002" if the pointer 36 and graduations 35 indicate the gear to be within the required limits, the gear will be satisfactory. Otherwise, it may be discarded.

The feeler arm 32 may be adjusted in height by means of an elevating nut 40 which is arranged to turn on the base 1 but which is prevented from turning with the threaded post 43 by means of a pin 41 entering a groove 42 in the nut, as shown in Fig. 3. A setscrew 44 also prevents the threaded post 43 from turning and may further be used to lock the post in place. The inclination of the feeler arm 32 may be adjusted by means of a pinch nut 45, clamping the hinge elements 46 which carry the feeler arm in a known manner.

Figure 6:
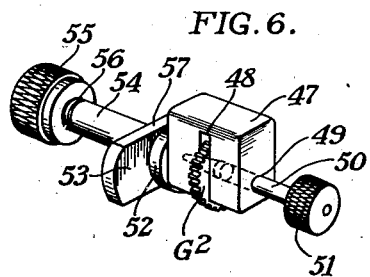
Fig. 6 is a perspective view of a second form of gear holder.

A second type of gear holder is shown in Fig. 6. Here, the gear $G^2$ to be tested is not provided with a shaft. However, the block 47 is provided with a slot 48 and with a bearing 49 through which a tapered bearing pin 50 may be inserted by means of a handle 51. This pin may be inserted to accurately position the gear $G^2$ and at the same time to permit the gear to turn. The block 47 carries an accurately formed pad 52, which in this instance is made cylindrical in form, which has a predetermined relationship to the pitch diameter that the gear $G^2$ should have. A guide member 53 is provided on the shaft 54 which may be passed through the bearing 27 of the hinged arm 28 and may be fastened in place by a screw 55 carried by the thread 56. The block 53 has a straight edge 57 which, as best shown in Fig. 4, locates the gear holder on the arm 28 by means of the flange 38 having a complemental-shaped shoulder 59 to locate the block 53.

The gear holder of Fig. 5 likewise has a straight edge similar to the edge 57 but not shown in Fig. 5 because it is on the opposite side of the block 21. It locates the gear holder on the arm 28 in exactly the same manner.

Figure 1:
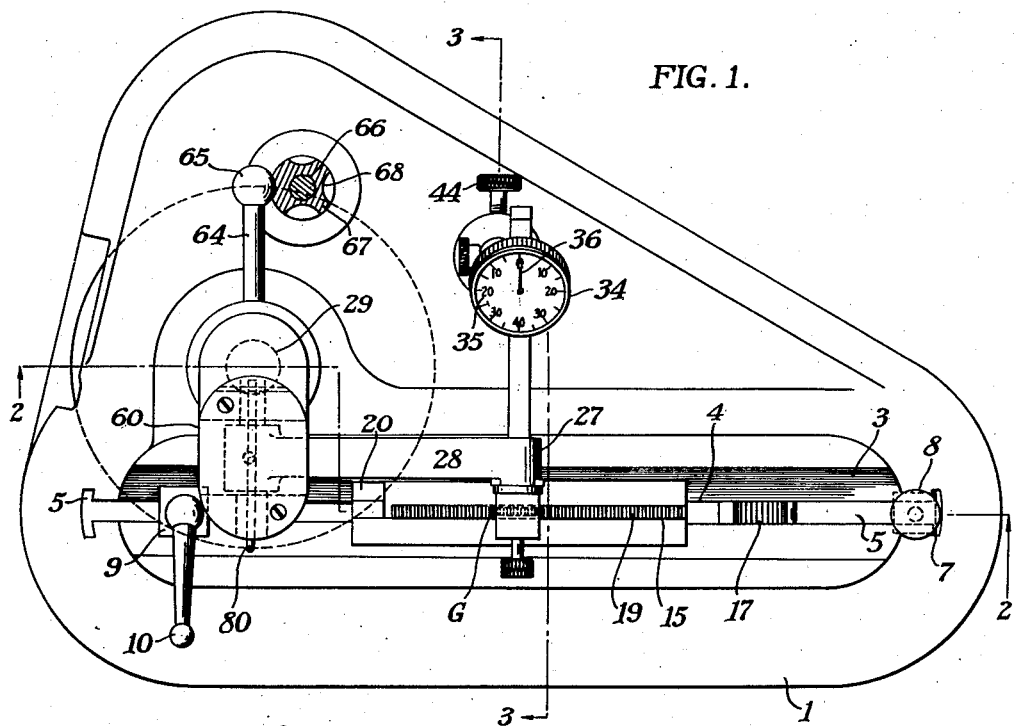
Fig. 1 is a top plan view of a gear testing machine constructed in accordance with and embodying a preferred form of my invention.
Figure 2:
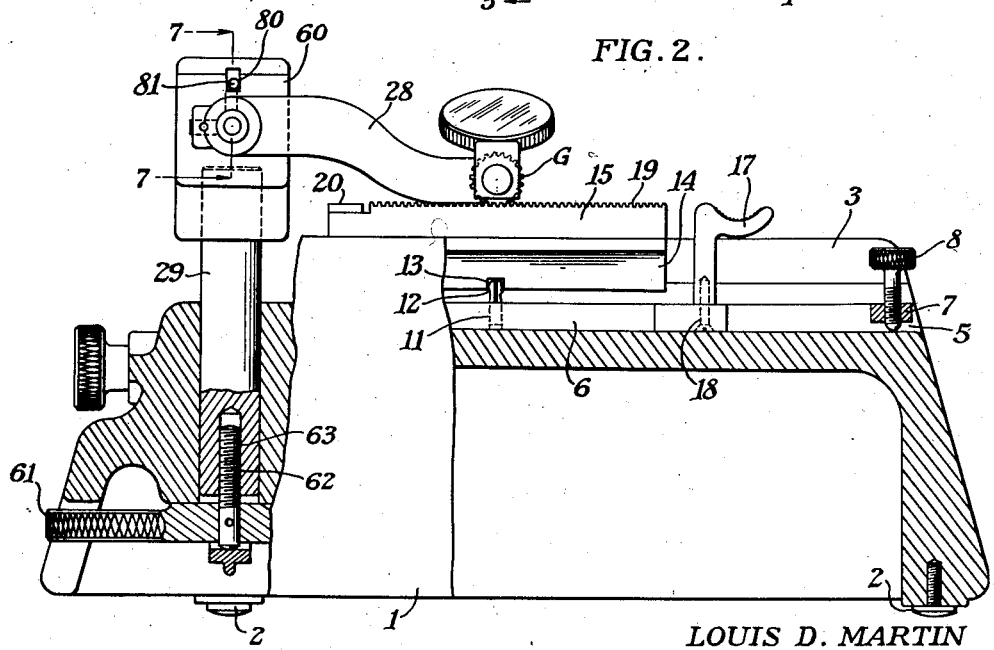
Fig. 2 is a sectional view partly in elevation, the section being taken on line 2—2 of Fig. 1.

As above explained it is necessary to incline the arm 28 at the proper angle in order to mesh the gear G to be tested with the teeth 19 of the testing tool 15. This may be accomplished in the following manner. Referring to Figs. 1 and 2 it will be noticed that the hinged arm 28 is mounted on a ball bearing support (not shown) on a member 60, this member in turn being carried by a post 29. The elevation of this post may be controlled by the hand wheel 61 attached to which is a screw 62 meshing with threads on the lower end of the post 63 so that, by turning hand wheel 61, the elevation of member 60 and with it the arm 28 may be controlled. The post 29 carries a second arm 64 fixedly mounted therein, this arm preferably terminating in a ball-shaped head 65. A locating post designated generally as 66 extends upwardly from the base 1, as indicated in Fig. 3, and this post preferably has a sleeve 67 slidably mounted thereon, this sleeve being equipped with one or more grooves 68, each having an accurate relationship to the master worm section in that each of these grooves is carefully ground to the sine of the angle of the arm to the slideway which will be necessary to properly position the particular gear G relative to the particular master worm section 19. The depth of the groove, in other words, is equal to the sine of the angle times the length of the arm 64, and since the radius of the groove is the same or substantially the same as the diameter of the ball-shaped end 65 on the arm 64. By placing the proper groove 68 in locative relationship on the post 66, it is only necessary to turn the post 29 until these parts contact in order to give the proper angular relationship to the arm 28. I prefer to graduate the various grooves into suitable units 70, as shown in Fig. 4, and I preferably provide a pointer 71 which will indicate the particular setting or the particular groove arranged to locate the arm 28. I, likewise, prefer to provide a series of sleeves with different depth grooves 68 so that any one of these can be held in position on the post 66 by means of a cap screw 72.

Since it is necessary to have a gear holder, such as shown in Figs. 5 and 6, for each spur gear to be tested, it is a simple matter to stamp on these holders a graduation or indication which will indicate to an operator the proper groove 68 which will be required for the particular setting of the arm 28 and when such a gear tool is to be used. Bearing in mind that this machine was designed for testing production gears, it will be seen that the initial setup is comparatively simple and can be made quickly, and after once inserting the proper gear holder, such as 21, 47 or the like, in the arm 28, the work may continue by merely inserting and removing the test gears, such as G, G¹, G² or the like, in their respective holders without removing the holder from the arm.

Figure 7:
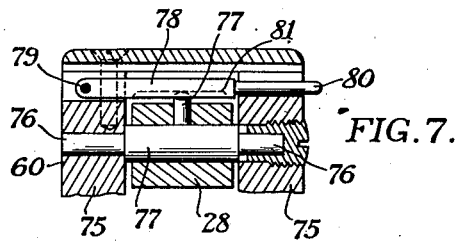
Fig. 7 is a detail sectional view taken on line 7—7 of Fig. 2 and illustrating the arm latch.

In order to hold the arm 28 in an inoperative and raised position for loading the gears into place to be tested, I provide a latch which, as indicated in Figs. 2 and 7, consists of the following structure. In Fig. 7, the member 60 is shown as consisting of a pair of spaced arms 75 each having bearings for the trunnions 76 of a shaft 77 on which the arm 28 is carried. The arm 28 carries a pin 77 extending upwardly into the path of a hinged latch member 78 which is pivoted upon a hinged pintle 79. A handle 80 extends into an operating position as indicated in Fig. 2 and this arm includes a beveled surface 81 arranged on the far side of the bar 78 as illustrated in Fig. 7. Thus, when the arm 28 is raised from its Fig. 2 position, the pin 77 will strike the bevel 81 causing the pin to rise and then drop down into the latching position shown in Fig. 7 in which position the arm will be held inoperative with the gear G spaced well above the teeth of the testing master worm section 15. In this inoperative position it is a simple matter either to change gears to be tested or to change also the gear holder if a different type of gear is to be next tested.

The operation of my machine is extremely simple and accurate testing can be accomplished relatively quickly. Selecting the proper gear testing tool 15, it may be readily placed in operative position by registering the notch 13 with the spring latch pin 12 as indicated in Fig. 2. The notch 13 is deep enough to always permit the rails 16 to rest upon and slide on the V-shaped rails 3 when the slide carrier 6 is moved back and forth by the handle 17. From the testing tool 15 or from the gear to be tested the angle of the arm 28 is determined preferably by suitable notations on the gear testing tool 15. The operator then selects a sleeve with the properly graduated groove 68 and slides it upon the pin 66 fastening the sleeve in the proper position by means of the cap screw 72. The post 29 is then swung until the ball 65 on the arm 64 rests in the proper groove 68 as indicated in Fig. 1. The arm 28 will then be properly positioned for the particular lead on the teeth 19 of the testing tool 15.

The post 29 may be raised or lowered to a convenient position by means of the wheel 61 and this movement can take place without altering the relationship between the arm 28 and the work testing tool 15 because the ball member 65 will merely slide axially of the post 66. The machine is then ready for use and, by raising the latch arm 80, the arm 28 may be lowered so that the pitch diameter pad, such as 52, 30 or the like, may be brought to rest on the pitch diameter pad 20 of the work tool 15. When in this position, feeler arm 32 will rest on the pad 31 and the operator then turns the rim 34 of the gauge until zero on the scale 35 lies just beneath the pointer 36. The handle 17 is then moved and the teeth of the gear G to be tested are brought into mesh with the master worm section teeth 19. By slowly sliding the rack 19, the gear G is revolved and any variations in the teeth will be registered by the pointer upon the scale. If the particular job requires it, the tooth or area of a gear which varies from the theoretical beyond a certain amount may be marked, as with a wax pencil, or the operator may be instructed to discard all gears in which the variation from the master worm section teeth is plus or minus a given figure, such as perhaps .0002".

It is usually convenient for an operator to adjust one or more of the stops 7 and 9 so that the testing tool 15 may be moved only a distance sufficient to engage at least once each of the teeth of the gear to be tested as this reduces the testing movement of the tool 15 to a minimum for each gear to be tested.

After the machine has been set up as above described, spur gears of a definite type may be rapidly tested one after the other by merely changing the gears in the holder without, of course, removing the gear holder from the arm 28.

Thus, with the gear holder shown in Fig. 6, each change of the gear G² can be accomplished by merely withdrawing the knurled head 51, dropping the gear G² out, replacing it with a second similar gear G² and replacing the tapered shaft 50 with the knurled head 51.

For best work it is, of course, necessary to make all of the parts of the machine accurate and to be particularly careful in arranging the slideway rails 3, the rails 16 of the testing tool, and of course the teeth 19 of the worm section must be made with a high degree of skill. However, since these teeth can be made on a precision thread grinder they can be ground with extreme accuracy. An accumulated tooth to tooth error may be held to .00005″ in a tool under seven inches in length. The profile error can be held from .00005″ to .00015″ in such a tool. It is to be understood that these figures are given as examples only and not as limitations.

It will be noticed from the above specification that I have provided a simple type of gear testing machine which can be operated successfully with relatively unskilled help and which will nevertheless give highly accurate results. Such a machine can readily be used for testing gears in production as well as occasional sample gears without adding too great an expense to the cost of such gears.

While I have described a preferred embodiment of my invention, it is obvious that various modifications will suggest themselves to those skilled in the art. I consider as within the scope of my invention all such forms as may come within the scope of the appended claims.

I claim:

1. A machine for testing gears comprising a base, a slideway on the base, a gear testing tool mounted to slide on the slideway, a post movably mounted on the base, an arm hingedly attached to the post, means for positioning the arm angularly with respect to the slideway including a second arm carried by the post and extending therefrom, and a gauge member including a pin projecting upwardly from the base and into the path of the second arm and including an accurately formed sleeve mounted on the pin and including an axially extending accurately formed surface adapted through contact with the second-mentioned arm to angularly locate the first-mentioned arm.

2. A machine for testing gears comprising a base, a slideway on the base, a gear testing tool mounted to slide on the slideway, a post movably mounted on the base, an arm, hingedly attached to the post, means for positioning the arm angularly with respect to the slideway including a second arm carried by the post and extending therefrom, a gauge member including a pin projecting upwardly from the base and into the path of the second arm, a sleeve mounted to turn on the pin a plurality of axially extending accurately formed surfaces formed thereon, any one of which may be positioned to contact with and position the second-mentioned arm and with it the hinged arm.

3. A machine for testing gears comprising a base, a slideway on the base, a gear testing tool mounted to slide on the slideway, a post movably mounted on the base, an arm, hingedly attached to the post, means for positioning the arm angularly with respect to the slideway including a second arm carried by the post and extending therefrom, a gauge member including a pin projecting upwardly from the base and into the path of the second arm, a sleeve mounted to turn on the pin, a plurality of axially extending accurately formed surfaces formed thereon, any one of which may be positioned to contact with and position the second-mentioned arm and with it the hinged arm, said second-mentioned arm and said accurately formed sleeve surfaces having generally complementary contacting surfaces.

4. A machine for testing gears, comprising a base, a slideway on the base, a gear testing tool mounted to slide on the slideway, a post movably mounted on the base, an arm hingedly attached to the post, means for positioning the arm angularly with respect to the slideway including a second arm carried by the post and extending therefrom, a gauge member including a pin projecting upwardly from the base and into the path of the second arm, a sleeve mounted to turn on the pin, a plurality of axially extending accurately formed surfaces formed thereon, any one of which may be positioned to contact with and position the second-mentioned arm and with it the hinged arm, means for adjusting the post axially of the post a predetermined distance, the accurately formed surfaces of the pin extending axially of the pin a distance sufficient for the second-mentioned arm and pin to remain in locating contact during axial adjustment of said post.

5. A machine for testing gears comprising a base, a slideway on the base, a gear testing tool mounted to slide on the slideway, a post movably mounted on the base, an arm hingedly attached to the post, means for positioning the arm angularly with respect to the slideway including a second arm carried by the post and extending therefrom, a gauge member including a pin projecting upwardly from the base and into the path of the second arm, a sleeve mounted to turn on the pin, a plurality of axially extending accurately formed surfaces formed thereon, any one of which may be positioned to contact with and position the second-mentioned arm and with it the hinged arm, said second-mentioned arm and said accurately formed sleeve surfaces having generally complementary contacting surfaces, means for adjusting the post axially, at least one of the generally complementary contacting surfaces extending axially of the pin a distance to locate one by the other during axial adjustment of the post.

6. A machine for testing gears comprising a base, a slideway on the base, a gear testing tool mounted to slide on the slideway, a post movably mounted on the base, an arm hingedly attached to the post, a latch for holding the arm in an inoperative position with respect to said tool, means for releasing the latch to move the arm toward the gear testing tool, a gear carrier on the arm for holding a gear to be tested thereon and which may be contacted with the gear testing tool carried by the slideway.

7. A machine for testing gears comprising a base, a slideway thereon, a toothed gear testing tool mounted on the slideway, a post mounted on the base, a hinged arm mounted on the post for movement to and from an operative position, a gear carrier for holding a gear to be tested on said hinged arm to be meshed with the toothed testing tool when said arm is moved to an operative position, a micrometer feeler gauge mounted on the base, a pad on the hinged arm positioned to contact with the feeler gauge whereby said gauge may indicate the accuracy of the gear teeth as the gear is moved over the toothed testing tool as the latter is moved on the slideway.

8. A machine for testing gears comprising a base, a slideway thereon, a toothed gear testing tool mounted on the slideway, a post mounted on the base, a hinged arm mounted on the post for movement to and from an operative position, a gear carrier for holding a gear to be tested on said hinged arm to be meshed with the toothed testing tool when said arm is moved to an operative position, a micrometer feeler gauge mounted on the base, a pad on the hinged arm positioned to contact with the feeler gauge whereby said gauge may indicate the accuracy of the gear teeth as the gear is moved over the toothed testing tool as the latter is moved on the slideway, and a latch for holding said hinged arm in an inoperative position to facilitate the loading and removal of a gear to be tested.

9. The structure called for in claim 7 in which the toothed gear testing tool is a worm section having lead, and in which there is a means carried by the base for positioning the arm to an angle determined by the lead of the worm section whereby a gear to be tested and carried by the hinged arm may be accurately meshed with the toothed worm section testing tool.

10. The structure called for in claim 1 characterized by the accurately formed surfaces on the pin and second-mentioned arm being in the form of a partially cylindrical groove on one locating part and an at least partially spherically shaped ball on the other locating part adapted to fit into the groove to define the angular position of the hinged arm.

LOUIS D. MARTIN.